United States Patent [19]
Tannehill et al.

[11] Patent Number: 5,158,310
[45] Date of Patent: Oct. 27, 1992

[54] DISPLAY SYSTEM FOR SHOPPING CART

[76] Inventors: John M. Tannehill, 2890 Lansdowne Road, Victoria, B.C. V8R 3P9, Canada; John B. Tannehill, 507 Briarwood Dr., Apt. 8C, Enterprise, Ala. 36330; Steven L. Kramer, 16227 NE. 113th Ct., Redmond, Wash. 98052

[21] Appl. No.: 549,291

[22] Filed: Jul. 11, 1990

Related U.S. Application Data

[63] Continuation-in-part of Ser. No. 519,211, May 4, 1990, Pat. No. 5,072,956, which is a continuation-in-part of Ser. No. 385,852, Jul. 26, 1989, Pat. No. 4,930,795.

[51] Int. Cl.$^5$ ............................................. B62B 39/00
[52] U.S. Cl. ................................ 280/33.992; 40/482; 186/62; 340/825.32
[58] Field of Search ...................... 280/33.992, 33.991; 40/308, 448, 590, 482; 340/825.32; 186/61, 62

[56] References Cited

U.S. PATENT DOCUMENTS

| | | |
|---|---|---|
| 3,098,213 | 7/1963 | Auer, Jr. ............................. 340/38 |
| 3,110,008 | 11/1963 | Kendall et al. ...................... 340/38 |
| 3,157,871 | 11/1964 | Umanoff .............................. 340/280 |
| 3,362,010 | 1/1968 | Rabinow .............................. 340/16 |
| 4,125,826 | 11/1978 | Rasmussen et al. ................ 340/63 |
| 4,236,255 | 11/1980 | Burgener et al. ................... 455/603 |
| 4,849,731 | 7/1989 | Melocik ............................... 340/435 |
| 4,862,160 | 8/1989 | Ekchian et al. ..................... 340/825.54 |
| 4,868,544 | 9/1989 | Havens ................................ 340/572 |
| 4,930,795 | 6/1990 | Tannehill et al. .................. 280/33.992 |
| 4,973,952 | 11/1990 | Malec et al. ........................ 186/62 |

FOREIGN PATENT DOCUMENTS

| | | |
|---|---|---|
| 0170194A3 | 2/1986 | European Pat. Off. . |
| 0254170 | 1/1988 | European Pat. Off. ....... 280/33.991 |
| 0421578A2 | 4/1991 | European Pat. Off. . |
| 3517818A1 | 11/1986 | Fed. Rep. of Germany . |
| 541170 | 7/1922 | France . |
| 563400 | 12/1923 | France . |
| 579600 | 10/1924 | France . |
| WO89/02628 | 3/1989 | PCT Int'l Appl. . |

Primary Examiner—David M. Mitchell
Attorney, Agent, or Firm—Christensen, O'Connor, Johnson & Kindness

[57] ABSTRACT

A display system (299) includes a visual display unit (300) mounted on a shopping cart (12d). In one preferred embodiment, a low-intensity ultrasonic signal is emitted by a transmitter (308) positioned at a desired location within a store for reception by a transducer (306) mounted on the shopping cart. The signal from the transducer (306) is transmitted to a switching circuit (316) to activate visual indicators in the form of directional lights (320, 322) thereby to direct the shoppers attention to a particular item located adjacent the transmitter (308).

4 Claims, 11 Drawing Sheets

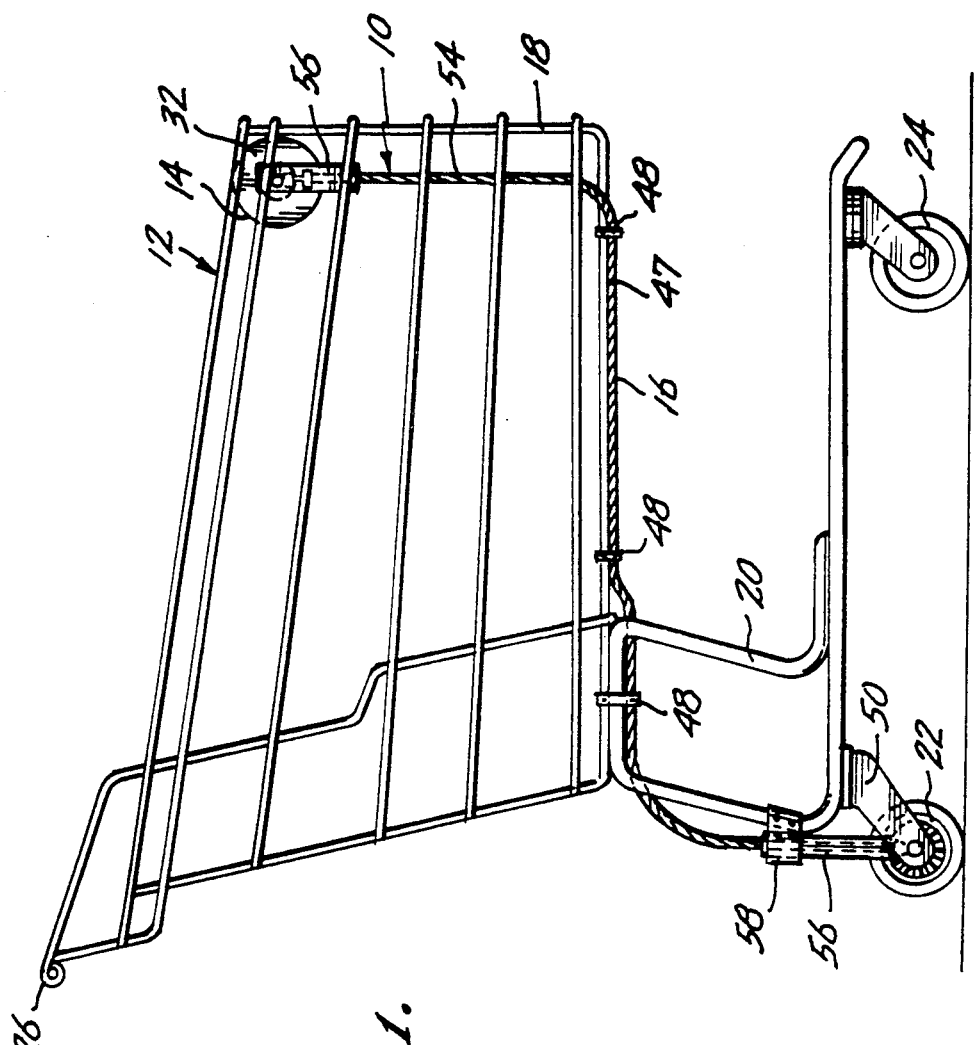

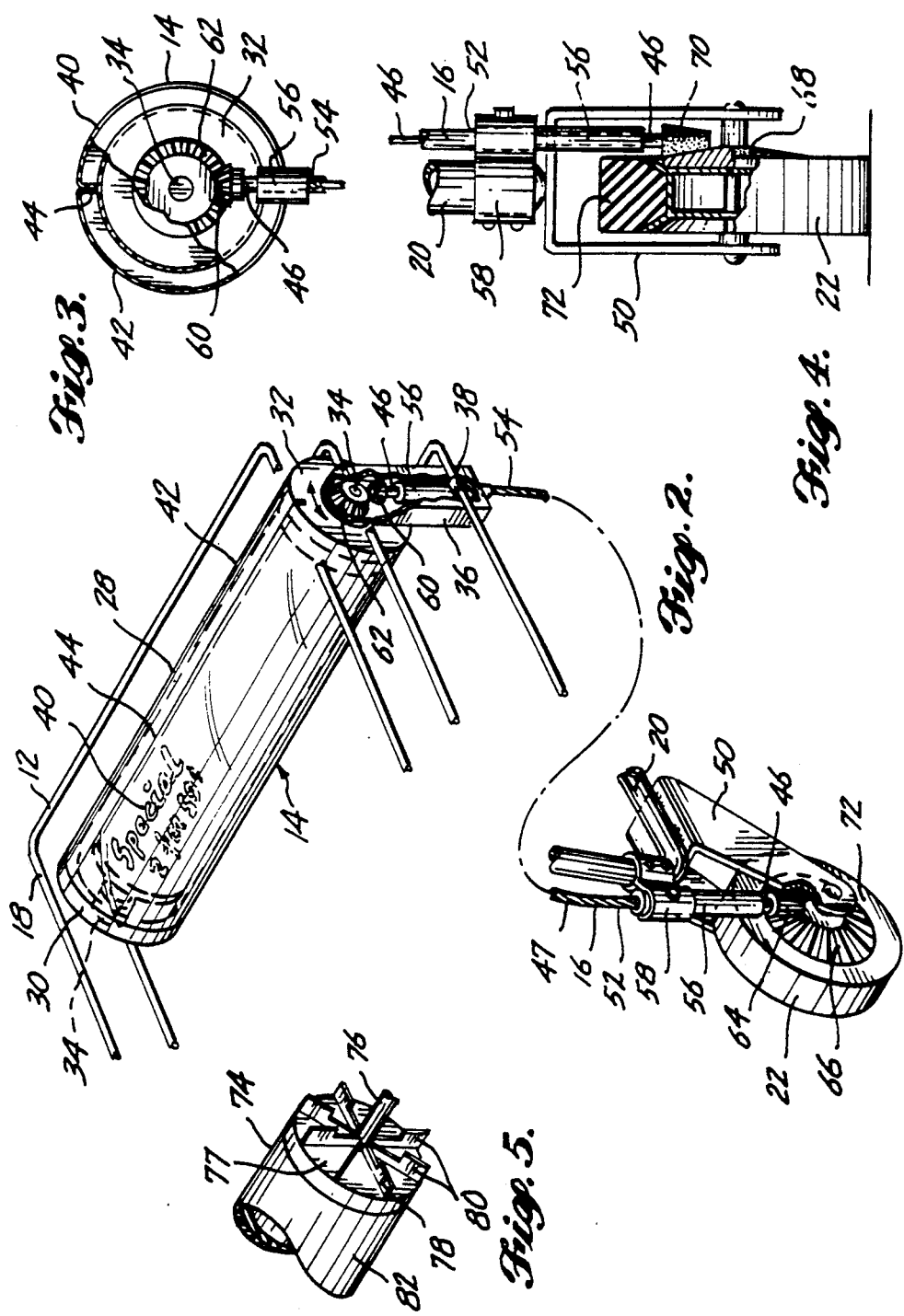

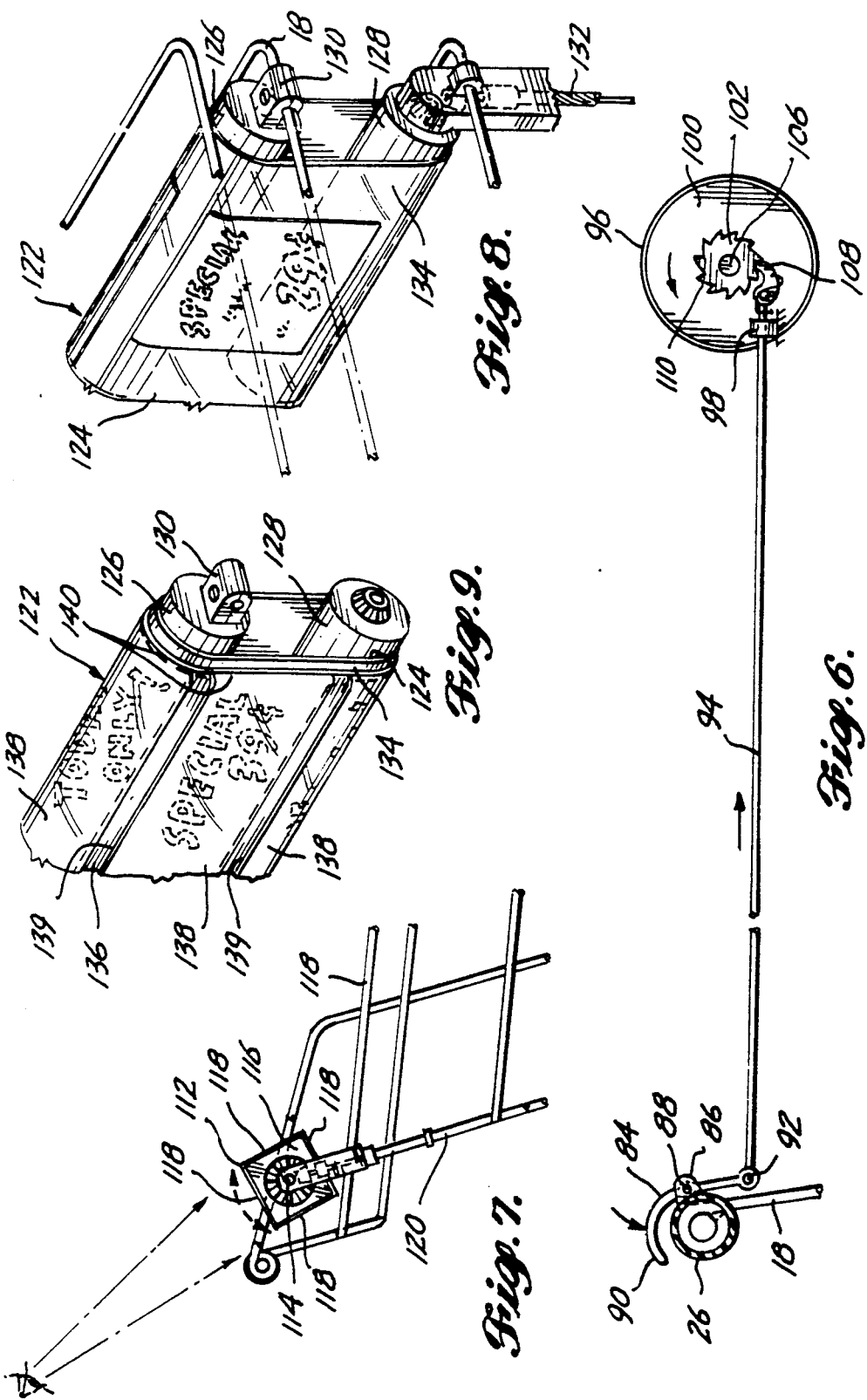

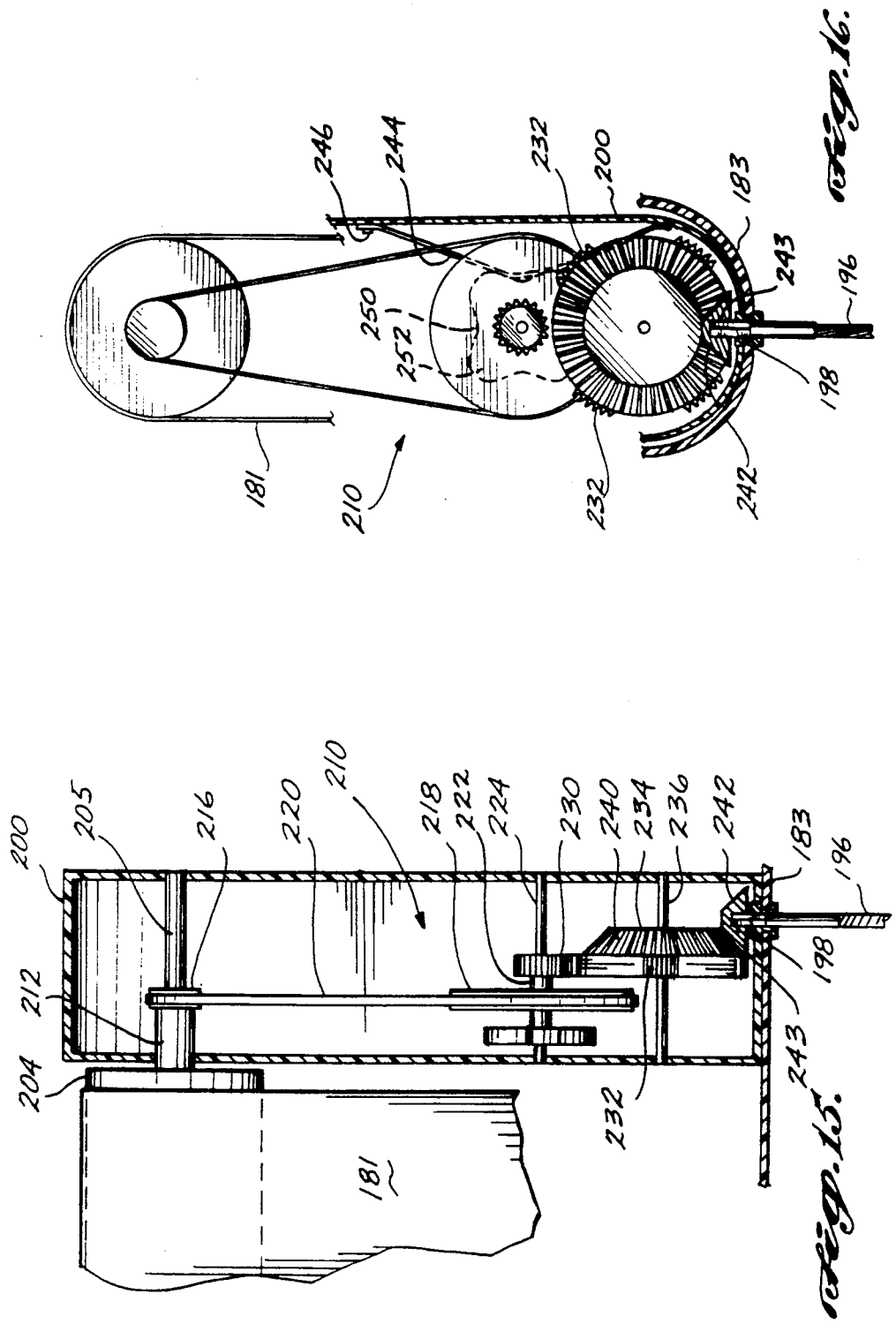

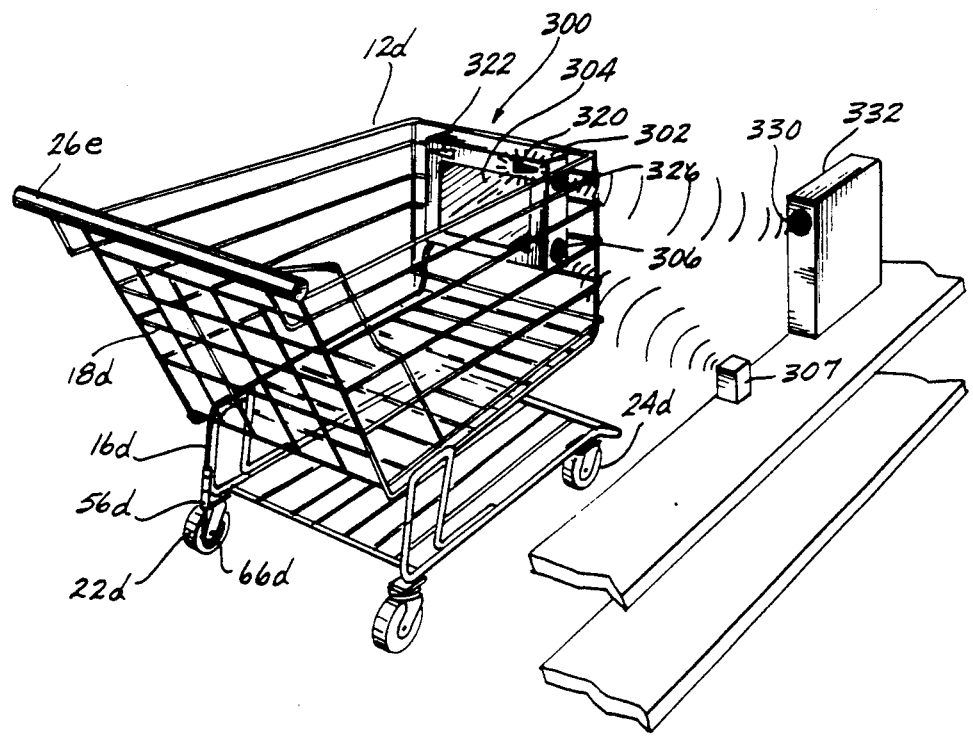
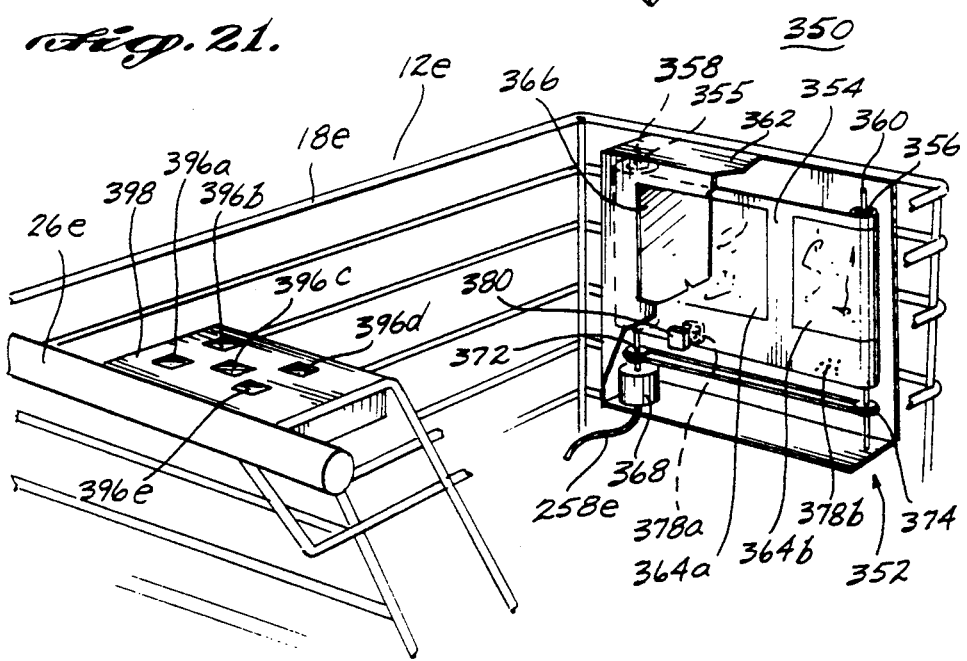

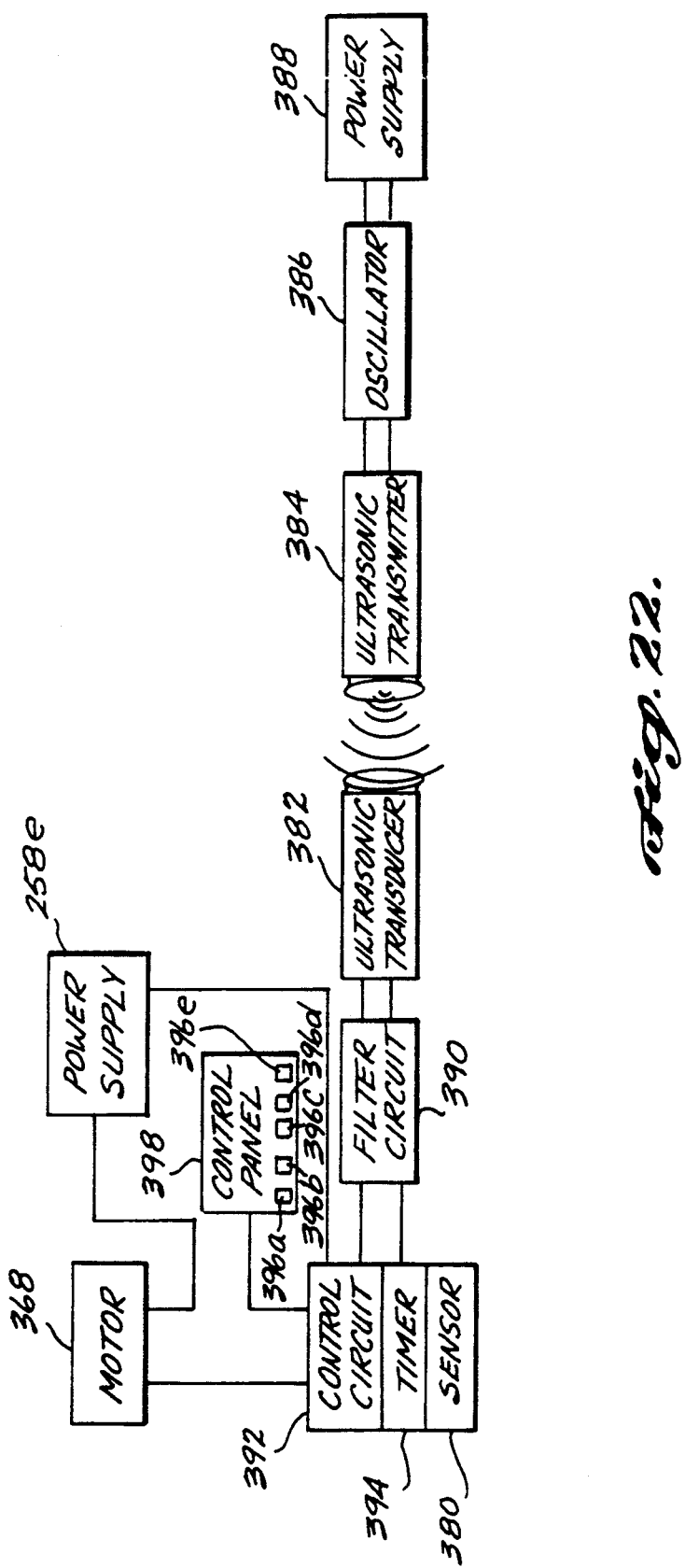

DISPLAY SYSTEM FOR SHOPPING CART

CROSS-REFERENCE TO RELATED APPLICATION

The present application is a continuation-in-part of U.S. patent application Ser. No. 519,211 filed May 4, 1990 and now U.S. Pat. No. 5,072,956, which in turn is a continuation-in-part of U.S. patent application Ser. No. 385,852, filed Jul. 26, 1989, now U.S. Pat. No. 4,930,795.

BACKGROUND OF THE INVENTION

The present invention relates to display systems for shopping carts, more particularly to powered advertisement displays for shopping carts, and more particularly to displays that are powered or activated by movement of the shopping cart.

Advertisement displays have previously been developed for mounting on shopping carts, and are intended to draw a shopper's attention while the cart is in use. Such displays are typically configured as flat advertising boards or display tubes that are mounted across the width of a shopping cart.

One example of a conventional display is provided by U.S. Pat. No. 4,513,983, issued to Calder, disclosing an elongated octagonal display tube that is mounted adjacent the shopping cart handle, and contains pockets for receiving strips of printed advertisements. A shopping cart user must rotate the display tube by hand to view the various advertisements mounted thereon.

A further example of a conventional display is provided by U.S. Pat. No. 4,021,953, issued to Couch, and also includes a display tube mounted adjacent the shopping cart handle. Again, the viewer must rotate the display tube by turning a knob attached to one end of the tube in order to view the advertisements disposed thereon.

These examples of conventional display tubes are limited in that the displays are static, i.e., do not move. The user of the shopping cart must take the affirmative step of rotating the tubes by hand to view the advertisements attached thereto. Most shoppers will not undertake this task and thus will not be exposed to the complete range of advertisements contained within the display. As such the shopper will not be motivated to purchase the items or services marketed on the display.

SUMMARY OF THE INVENTION

The present invention discloses a powered, moving display for shopping carts that includes a display unit mounted to the cart and a power transmission system that acts to power the display unit when the shopping cart is moved by the user. This allows the display unit to change with the movement of the shopping cart and exposes the shopper to a range of advertisements or other visual matter without necessitating any affirmative action other than simply pushing the shopping cart. The power transmission system utilizes at least one of the wheels of the shopping cart whereby the rotational movement of the cart is utilized to power the display unit.

In a preferred embodiment, the display unit is rotary in nature, being automatically rotated by the power transmission system as the cart is pushed. In a specific aspect of the present invention, the display unit includes a display drum around which printed advertisements or other visual matter are disposed. The power transmission system may include a bowden cable drivingly interconnected by gears or frictional drive rollers to one end to the display drum. The other end of the bowden cable is drivingly interconnected by gears or frictional drive rollers to one of the wheels of the shopping cart. The rotational movement of the wheel during travel of the shopping cart is transmitted by the bowden cable to the display drum, resulting in the rotation thereof together with the printed advertisements or other visual matter mounted on the display drum.

An alternate power supply system may be provided by the mounting of a wind vane to the rotary display, with a wind force being generated by movement of the shopping cart. The wind force acts against the vanes to rotate the display unit.

Another alternate power transmission system may be provided by a lever grip pivotally mounted at a fulcrum point on the handle of a shopping cart. A proximal first edge portion of the lever grip is depressed towards the handle when the user grasps both the handle and the lever grip, resulting in advancement of an extension rod that is pivotally mounted to a distal second edge portion of the lever grip. A pawl, secured to the extension rod, engages with a ratchet wheel mounted on one end of the rotary display unit so that each depression of the lever grip results in rotary advancement of the ratchet wheel and rotary display unit.

In a further aspect of the present invention, the rotary display unit includes a flexible display belt trained over a drive roller and at least one spaced apart idler roller, with the rollers being rotatably mounted on the cart. The idler roller(s) is freely rotatable while the drive roller is driven by the power transmission system linked to a cart wheel. Advertisements or other visual matter are disposed on the outside of the flexible display belt, with the belt being drawn taut over the idler roller(s) and drive roller so that it is advanced by rotation of the drive roller.

In a further more specific aspect of the present invention the rotary display unit is intermittently advanced or rotated by the power transmission system a selected distance to move an advertisement or visual matter quickly into view. The advertisement is held in place for a period of time and then the power transmission system quickly advances the rotary display to position the next advertisement or visual matter into view. As a result, when a shopping cart is stationary, an entire advertisement is in view of the shopper.

In a further aspect of the present invention an electronic display screen is mounted on the cart to be viewable by the shopper. Electricity to operate the display screen is produced by an electrical generator powered by the power transmission system from one of the wheels of the moving shopping cart. A regulator to control the voltage and/or current transmitted to the electronic display from the generator may be employed. In addition, a battery may be interposed between the regulator and the electronic display device to power the display when the shopping cart is stationary.

Other aspects of the present invention disclose display systems used in conjunction with shopping carts. In a preferred embodiment, a first audio signal generator is located remote from the shopping cart and a first audio signal receiver is mounted on the shopping cart to receive signals from the first audio signal generator that are beyond the range of the human ear. A visual output device is also mounted on the shopping cart and controlled by an electronic circuit which activates the visual output device when a signal from the first signal generator is received by the first signal receiver. The visual output device may alternatively be in various embodiments, for instance, in the form of an indicator light to provide a visual cue to the shopper of a particular item located adjacent the first signal generator. The visual output device may be in the form of printed matter or a video display. Also, an audio output within the range of the human ear may be associated with the signal light or other type of visual display.

In a further aspect of the present invention, a second signal generator may be mounted on the shopping cart and activated when the first signal is received by the first signal receiver. A display unit, located at a particular location remote from the shopping cart, is activated through a second signal receiver operably associated with the remote display to receive signals from the second signal generator. When the shopping cart passes by the remote display, the second signal is received by the second signal receiver from the second signal generator causing the remote display to be automatically activated to present an advertisement or other visual and/or audio matter to the shopper.

In another display system in accordance with the present invention, a first display unit is mounted on the shopping cart. The first display unit includes a number of individual visual displays. The display unit is powered so that the individual visual displays are sequentially presented to the user of the shopping cart. An optical, electromagnetic or other type of indicator or code is associated with each visual display. A sensor is provided for sensing the particular indicator or code present and thus the particular visual display being presented to the user of the shopping cart. A control system is operably associated with the power system for the display unit and with the sensing unit to control the movement of the visual displays.

In another more specific aspect of the present invention, the control system includes a signal receiver to receive a signal of a particular frequency from a signal generator positioned at a desired location. When the shopping cart moves by the signal generator, the signal is transmitted to the receiver, and then to the control system. The control system then indexes the display system on the shopping cart to present a particular display to the user of the cart corresponding to the frequency of the signal received by the signal receiver, for instance, an advertisement for a particular item adjacent the signal generator.

In a further aspect of the present invention, the control system on the shopping cart includes a manually operable portion whereby the user of the shopping cart may select particular visual displays desired to be viewed.

BRIEF DESCRIPTION OF THE DRAWINGS

The present invention will presently be described in greater detail, by way of example, with reference to the accompanying drawings in which:

FIG. 1 is a side elevation view of a preferred embodiment of a powered display of the present invention wherein the display unit is rotary in nature and mounted on a shopping cart;

FIG. 2 is a pictorial view showing details of a power transmission system utilizing gearing;

FIG. 3 is a side elevation view of the rotary display shown in FIG. 1;

FIG. 4 is a rear elevation view in a partial cross section showing a power transmission system composed of a frictional drive mechanical linking of a bowden cable to a shopping cart wheel;

FIG. 5 is a pictorial view of an alternate wind vane power transmission system;

FIG. 6 is a side elevation view of an alternate lever grip power transmission system;

FIG. 7 is a side elevational view of a multi-sided rotating display unit;

FIG. 8 is a partial pictorial view of a rotary display unit in the nature of a flexible belt framed over spaced apart drive and idler rollers;

FIG. 9 is a partial pictorial view of the belt display unit of FIG. 8 including advertising display pockets;

FIGS. 15 and 16 are fragmentary views illustrating the drive system of the display cassette shown in FIGS. 12-14;

FIG. 19 is a pictorial view illustrating a display system constructed in accordance with the present invention;

FIG. 21 is a fragmentary pictorial view of another preferred embodiment of the present invention; and, FIG. 22 is a schematic view of the display system shown in FIG. 21.

DETAILED DESCRIPTION OF THE PREFERRED EMBODIMENT

Figure 10:
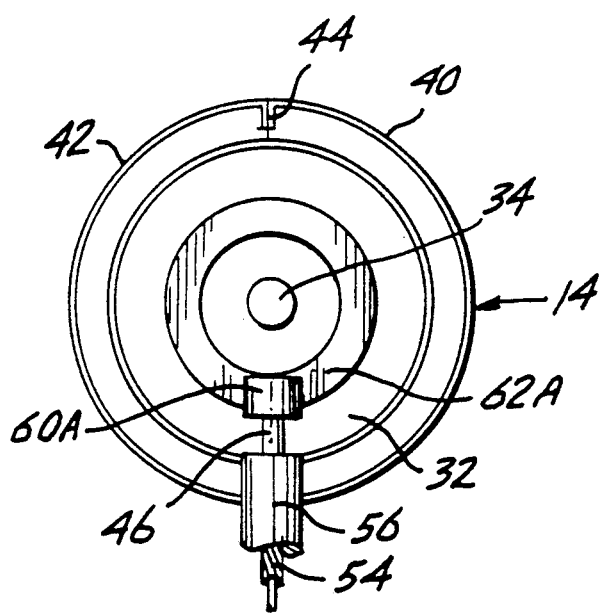
FIG. 10 is a side elevational view of a rotary display unit utilizing a frictional drive power transmission system linking a bowden cable with a wheel of a shopping cart.

A preferred embodiment of a powered advertisement display 10 mounted in a conventional shopping cart 12 is shown in FIG. 1. The display 10 is of a rotary nature and includes a generally cylindrical display drum 14, on which printed advertisements are disposed. The drum is rotatably mounted on the shopping cart 12 and drivingly connected to a power supply system utilizing a power transmission mechanism 16.

The shopping cart 12 illustrated is typical of conventional carts, and include an upwardly opening basket 18, formed from a grid of welded rods, for receiving merchandise. The basket 18 is mounted atop an underlying frame 20. Two rear wheels 22 are rotatably secured to a rear end of the cart frame 20, and two front wheels 24 are caster-mounted to the front end of the cart frame. An elongated, transversely extending, cylindrical handle 26 is attached to the cart at the rear of the basket 18.

Referring to the detailed pictorial view of the display 10 in FIG. 2, the rotary display drum 14 includes an elongated cylindrical body portion 28, preferably formed from hollow plastic or metal piping to reduce weight, and two circular end caps 30 and 32 attached to the body portion 28 to close the body portion's ends. The end caps 30 and 32 each have a circular opening at the cap's center point into which is mounted a conventional ball bearing assembly (not shown). Two stub shafts 34 project outwardly from the inner race of the ball bearing assemblys for mounting on the shopping cart 12.

As illustrated in FIG. 2, the display drum 14 is preferably mounted transversely across the width of the basket 18, inside the front portion of the basket and adjacent the basket's upper edge. The stub shaft 34 projecting from the end cap 30 of the display drum is detachably secured to the basket 18 by any convenient means, for instance, by a bracket, not shown. The other stub shaft 34, projecting from the end cap 32 of the display drum, is mounted on the basket 18 by insertion into a circular opening formed within a drive housing 36. The drive housing 36 is attached to the basket 18 adjacent the end cap 32 by two clamps 38 that are installed over grid rods of the basket and fastened to the drive housing.

Although the display drum 14 is illustrated in FIGS. 1 and 2 as mounted on stub shafts 34 to extend across the width of the front end of the shopping cart 12, it should be understood that the display drum could be mounted across the shopping cart at other points or mounted vertically with respect to the sidewalls of the shopping cart.

Visual matter, for instance in the form of printed advertisements 40, such as in-store merchandise specials, are preferably mounted on the outer surface of the display drum 14, and may be covered by a substantially transparent flexible sheath 42 formed from a translucent plastic, such as polyester or polyvinylchloride, to protect the advertisements, as shown in FIG. 2. FIG. 3 illustrates one method of mounting the visual matter, wherein a printed advertising sheet 40 is wrapped around the drum where it may be secured by any appropriate method such as by an adhesive backing or tape. The protective sheath 42, configured nominally in a cylindrical shape, having a length matching the length of the drum and a diameter slightly greater than the circumference of the drum, is then wrapped around the drum 14 and the advertisement 40, and the mating transverse edges of the sheath are inserted into an elongated slit 44 extending along the length of the drum 14. The sheet thus installed acts to further retain the positioning of the printed advertisement sheet 40 and protect it from moisture and dirt.

The display drum 14 is powered by movement of the cart, with several possible power transmission or drive mechanisms linking the display drum to the cart. In a preferred embodiment of the present invention illustrated in FIG. 2, a bowden cable 16 similar, for instance, to that used in automobile speedometers, is utilized to rotatably link the display drum 14 to a shopping cart rear wheel 22. The bowden cable 16 contains a rotating flexible cable core 46 that is housed within a flexible wire or sheet metal reinforced outer tubular sheath 47. The bowden cable 16 is secured by a series of clamps 48 at various points along the length of the shopping cart 12. Linkages other than a bowden cable may be utilized, such as a rigid rod, although the bowden cable's flexibility makes it ideal for ease of installation.

As illustrated in FIGS. 1 and 2, the rear cart wheel 22, secured by a U-shaped, downwardly extending bracket 50 to the underside of the shopping cart frame 20, is used to drive the powered display 10. The display could alternately be powered by a castered front wheel 24 of the shopping cart, but the extra plane of rotation of the wheel due to the caster mounting would increase the complexity of the linkage required. The bowden cable 16 has a lower, rear end portion 52 that is mechanically linked or coupled to the wheel 22, and a forward, upper end portion 54 that is mechanically linked or coupled to the rotary display drum 14. The bowden cable end portions 52 and 54 each terminate in a hollow cylindrical end collar 56 that secures the outer sheath 47 of the bowden cable therein and permits free rotation of the inner core 46, with the inner core 46 projecting axially outward from each end collar 56. The end collar 56 securing the lower end portion 52 of the cable 16 is mounted to the shopping cart frame 20 by a clamp 58 located above the wheel 22, with the cable lower end portion 54 being disposed perpendicularly to and adjacent the wheel's axis of rotation. The end collar 56 securing the upper end portion 54 of the cable 16 is mounted within the drive housing 36, with the upper end portion 54 being disposed perpendicularly to the drum 14 axis of rotation adjacent the end cap 32.

Referring to FIG. 3, a preferred method for operably connecting the upper end portion 54 of the bowden cable to the display drum 14 is shown. A small bevel drive gear 60 is axially attached to the rotating core 46 of the bowden cable 16, and meshes with a larger and corresponding beveled follower gear 64 that is axially mounted over the stub shaft 34 and secured to the end cap 32. Rotation of the drive gear 60 results in rotation of the follower gear 62, and thus the display drum 14. If it is desired to slow the rotation of the display drum 14 with respect to the shopping cart wheel 22, one or more intermediate reducing gears, not shown, may be housed in the drum housing 36 and rotatably engaged between the drive gear 60 and the follower gear 62.

In this preferred embodiment, an interconnecting drive gear and follower gear, similar to that discussed above for the display drum interlinking, is also utilized to interconnect the bowden cable 16 to the shopping cart wheel 22, as illustrated in FIG. 2. Specifically, a small frustoconical beveled follower gear 64 is secured to the inner core 46 of the lower end portion 52 of the bowden cable 16, and meshes with a perpendicularly disposed, larger, and correspondingly beveled drive gear 66 that is mounted on the shopping cart wheel 22 about its axis of rotation. The geared interconnection of the bowden cable 16 to the display drum 14 and the wheel 22 facilitates rotation of the drum even when merchandise is piled in the cart and contacts the outer surface of the drum 14. However, it should be understood that this gearing is only one method for interconnecting the drive system, and that other interconnecting methods may be used. For example, an alternate interconnecting drive system is shown in FIG. 4, utilizing a frictional annular drive surface 68 and a frictional follower roller 70 to interconnect the lower end portion 52 of the bowden cable 16 to the shopping cart wheel 22. The frustoconical rubber-coated follower roller 70 is axially secured to the inner core 46 of the lower end portion 52 of the bowden cable 16, and is disposed adjacent and perpendicular to the central axis of rotation of the wheel 22. The corresponding frustoconical rubber drive surface 68 is secured to the wheel 18 about its axis of rotation adjacent, and contacting, the follower roller 38. The frictional drive surface 68 transmits the rotation of the wheel 22 to the end of the bowden cable 16 due to friction present between the follower roller and the drive surface. Although the drive surface 68 and follower roller 70 are shown with frustoconical configurations in FIG. 4, the frictional drive surface could alternately comprise a flat annular ring, with the drive roller 70 being cylindrical, so long as they are disposed sufficiently close together for frictional interconnection. Also, the annular frictional drive surface 68 may be formed by the sidewall of a rubber tire 72 mounted on the cart wheel 22, rather than by a separate rubber ring mounted about the wheel's axis.

A similar frictional drive could be used to link the bowden cable 16 to the display drum 14, instead of using the gears 60 and 62. A rubber disk 62A may be secured to the end cap 32 of the display drum 14. This frictional disk surface would contact a frictional drive roller 60A, such as a rubber-coated roller, axially secured to the upper end portion 54 of the bowden cable. The frictional drive roller and follower surface would be sufficiently proximate to transmit rotation of the roller to the display drum.

The above described methods for powering the display drum 14 by operable interconnection of the drum to the rotation of a shopping cart wheel are provided as examples of possible power transmission mechanisms. Other alternative power transmission mechanisms may be used. One such alternative is illustrated in FIG. 5, and includes a rotational mounting similar to that described above for the first preferred embodiment. A display drum 74 is rotatably mounted transversely across the shopping cart on stub shafts 76 that project outwardly from ball bearings (not shown) housed in drum end caps 77, with the stub shafts 76 being bolted to the shopping cart basket. Located on one, or optionally both, longitudinal end cap 77 of the display drum 74 is a wind vane assembly 78. The wind vane assembly 48 contains a plurality of relatively thin vane blades 80 that project outwardly from the end cap 77 of the display drum 74, and are spaced radially around the stub shaft 76 in a fan-like configuration. As the shopping cart is moved, the vane blades 80 are acted on by reaction with the air, resulting in rotation of the drum 74.

To facilitate this wind vane embodiment in providing reliable rotation of the drum 44, preferably the drum is manufactured of lightweight material, such as a thermoplastic resin or aluminum. A substantially transparent rigid sheath 82 having an inside diameter slightly larger than the outside diameter of the drum 44 may be inserted over the drum 74 and stationarily mounted by brackets (not shown) projecting inwardly from the shopping cart basket so that the drum 74 is free to rotate within the sheath 82. The stationary mounting of the sheath 82 would prevent merchandise piled within the cart from stopping the rotation of the display drum 74.

Another example of an alternate preferred embodiment of the present invention is shown in FIG. 6. As illustrated, a power transmission mechanism for driving a display drum 96 includes a manually graspable grip lever 84 that is mounted adjacent the shopping cart handle 26. The grip lever 84, as illustrated, is preferably constructed from an elongated rectangular sheet of metal or plastic, and is formed to curve across its width, with the radius of curvature corresponding to but larger than the diameter of the handle 26. The grip lever is disposed parallel to and overlying the portion of the handle 26 facing the basket 18 of the shopping cart. The grip lever extends between two mounting flanges 86 that project from the handle 26 forwardly towards the cart basket.

The grip lever 84 is pivotally secured to the flanges 86 by stub pins 88 to create a fulcrum point for pivoting of the grip lever 84. This arrangement results in a proximal top elongated curved edge portion 90 of the grip lever 84 being nominally spaced away from and adjacent the uppermost longitudinal edge of the shopping cart handle 26.

The corresponding curvature and proximate spacing of the grip lever 84 and handle 26 results in both the grip lever and the handle being grasped by a user for movement of the cart. Grasping the grip lever 84 and shopping cart handle 26 causes the top edge portion 90 of the grip lever to be depressed downward towards and against the shopping cart handle 26, with the grip lever pivoting upon the fulcrum point located at the stub pins 88. The pivoting of the grip lever 84 results in forward movement of a distal, bottom edge portion 92 of the grip lever 84, which normally is disposed to project tangentially downward from the forward surface of the shopping cart handle 26.

An elongated push rod 94 serves as an extension rod to connect the grip lever 84 to the cylindrical display drum 96. The push rod has a first end that is pivotally secured to the bottom edge portion 92 of the grip lever 84. The push rod 94 is in turn slidably secured to one side of the cart basket 18 by one or more mounting clamps 98. The forward end of the push rod 94 projects towards an adjacent end cap 100 of the rotary display drum 96, with the display drum mounted transversely across the front end of the shopping cart.

A toothed ratchet wheel 102 is mounted over a stub shaft 106 and is secured to the end cap 100 of the rotary drum 96 about the drum's axis of rotation 106. A pawl 108 is pivotally mounted on the forward end of the push rod 94, and engages between teeth 110 formed around the circumference of the ratchet wheel 102. Depression of the grip lever 84 results in the advancement of the push rod 94 towards the front end of the cart, causing advancement of the ratchet wheel 102 by the pawl 108 and the corresponding rotation of the display drum 96. A spring (not shown) is mounted between the top edge portion 90 of the grip lever 84 and the handle 26 to bias the grip lever 84 away from its depressed position, causing the push rod 94 to retract towards the rear of the cart 12 when the handle 26 is released. Subsequent grasping of the shopping cart handle 26 as a shopper moves about a store results in the incremental advancement of the display drum 96 to display the full circumference of printed advertising secured thereon. A shopper may rapidly and repeatedly squeeze and release the handle 26 and the grip lever 84 to view the entire drum surface, if desired.

In the illustrations of FIGS. 1–6, preferred embodiments of a powered, rotary display drum are shown each having a generally cylindrical configuration, but other shapes are possible. One such alternative example is that of the square cross sectioned tubular display member 112 illustrated in the cross-sectional view of FIG. 7. The square cross sectioned display member 112 may be mounted rotatably along its longitudinal axis on stub shafts 114 projecting from ball bearings (not shown) installed in the center of end caps 116, similar to the mounting of the cylindrical drums in the prior figures. The planar, elongated faces 118 of the outer surface of the display member 112 provide pronounced distinguishment of the different visual messages contained thereon. Although the display member 112 is illustrated as mounted across the front of the cart basket 18, it may be mounted elsewhere on the cart as desired. The display member 112 may be powered by a bowden cable 120, as described in the previous preferred embodiment.

It is to be understood that other configurations for the rotary drum are possible, such as one including differing numbers of substantially planar faces included on its outer surface to form, for instance, octagonal or hexagonal cross sections. As another example of an alternative configuration, the display unit could comprise an annular disk-shaped member having advertisements displayed on the outer surface thereof.

Another alternate configuration for the powered display unit is illustrated in FIGS. 8 and 9, which show a rotary belt display 122 that includes a flexible, endless display belt 124 to present a relatively flat visual media surface to the shopping cart user. The flexible display belt 122 is trained over, and drawn taut, by two parallel, vertically displaced rollers, with the upper roller 126 serving as an idler roller and the lower roller 128 serving as the drive roller. The idler roller 126 is freely rotatably mounted transversely across the upper portion of the front end of the shopping cart by any convenient method, for instance by insertion of stub shafts (not shown) that project axially from the ends of the roller into ball bearings (not shown) housed within mounting blocks 130 that are bolted or otherwise secured to the basket 18. The drive roller 128, preferably has a similar diameter and is rotatably mounted on the shopping cart and spaced vertically below and parallel to the idler roller 126, by stub shaft and roller bearing assemblies similar to that described above with respect to FIGS. 1 and 2. The drive roller 128 is powered by the movement of the cart by a power transmission mechanism which includes a bowden cable 132 that is connectable to a wheel of the cart (not shown), similar to the power transmission mechanisms described previously.

The display belt 124 may be formed of any appropriate, strong, flexible material, such as a cloth-reinforced rubber sheet, a metal screen, or plastic laminated cardboard, etc. The display belt 124 has an outer surface 134 to which advertisements or other visual matter may be secured, for instance, by adhesives or tape. Alternately, as shown in FIG. 9, the outer surface 134 of the belt 124 may be covered by a substantially transparent flexible plastic film 136 that is in turn secured around one side edge of the belt. One or more pockets 138 are formed between the inside of the plastic film 136 and the outer surface 134 of the display belt 124. As illustrated in FIG. 9, the flexible plastic film 136 may be joined to the display belt 124 along various adhered lines 139, extending transversely across the width of the belt, to define a plurality of pockets 138. Printed advertisement sheets 140 or other visual matter may be mounted on the display belt 124 by insertion into the pockets 138.

Powered, rotational advancement of the drive roller 128 by the bowden cable 132 results in movement of the belt 124, which passes over the surface of the freely rotating idler roller 126. The idler roller 126 may be spring biased (not shown) upwardly away from the drive roller 128 to maintain the necessary tension required to reliably power the display belt.

In the preferred embodiments illustrated in FIGS. 8 and 9, the drive roller 128 and inner surface of the display belt 124 are rubber coated to produce high frictional coefficients. However, other methods of engaging the drive roller 128 with the display belt 124 are possible, such as the attachment of a sprocket gear (not shown) at one or both ends of the drive roller 128, with corresponding perforated holes located around the circumference of the display belt 124 to engage with the sprocket gear during rotation of the drive roller 128.

Several other alternate configurations for the drive belt display of FIGS. 8 and 9 are possible. For instance, instead of using a separate display belt 124 on which advertisements are disposed, the advertisements could be printed directly onto a sheet of plastic laminated cardboard that is formed into a belt by joining its edges with staples. The flexible cardboard sheet would act both as the belt and the advertising medium.

Other means of advancing the drive roller 128 are possible, such as the push rod and ratchet mechanism of the previous preferred embodiment shown in FIG. 6. Similarly, a plurality of idler rollers could be used in place of a single idler roller to cause the display belt to conform around the outer contours of a shopping cart to increase the total area for advertisement display, or the display belt could alternatively be mounted adjacent the rear or any side of the shopping cart.

Figure 11:
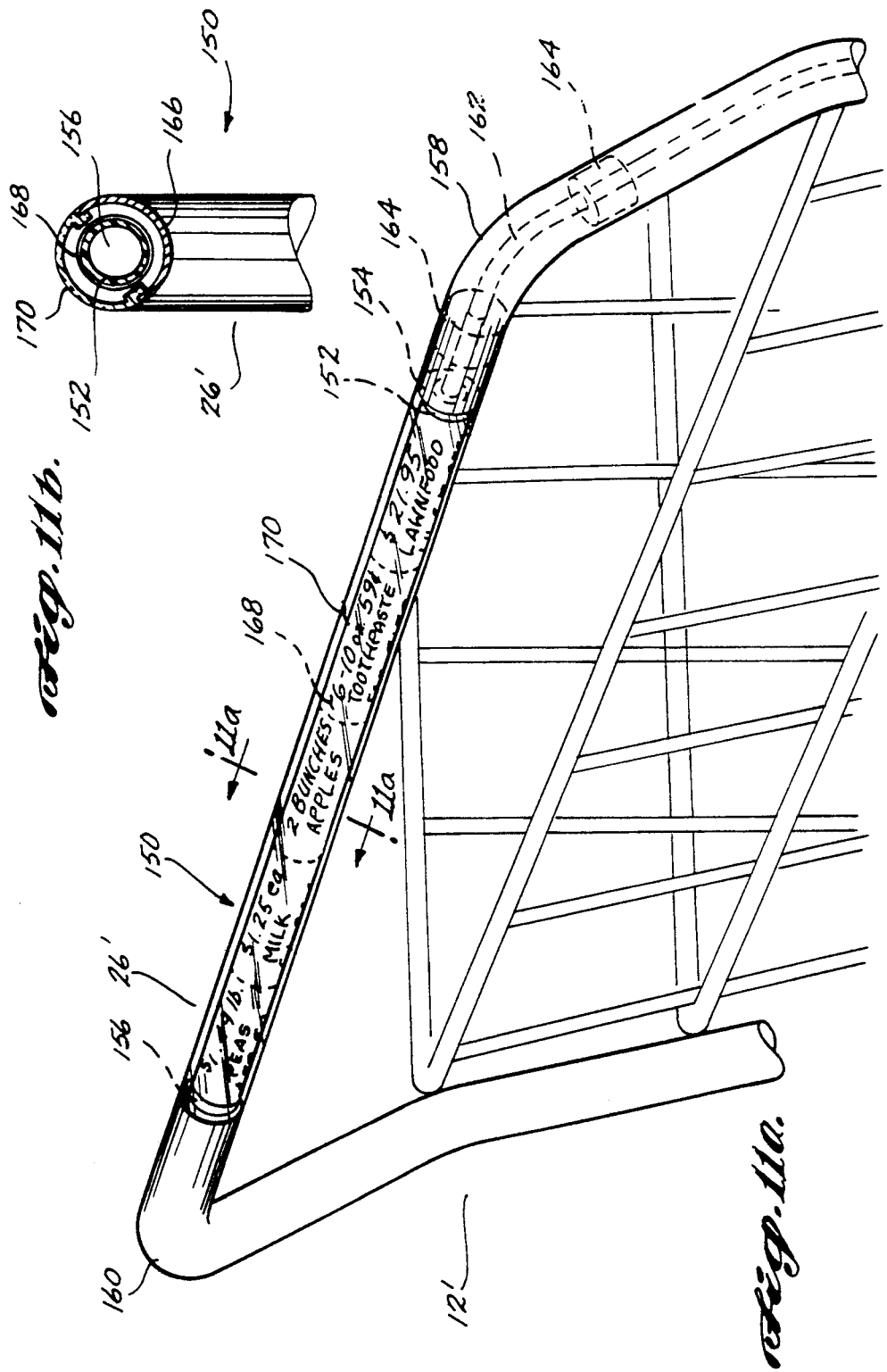
FIG. 11a is a pictorial view of a further preferred embodiment of the present invention wherein the display unit is rotary in nature and integrated into the handle of a shopping cart.
FIG. 11b is an enlarged cross-sectional view of FIG. 11a taken substantially along lines 11a—11a thereof.

A further preferred embodiment of the present invention is illustrated in FIGS. 11a and 11b wherein a rotatably powered display unit 150 is integrated into the handle 26' of the shopping cart 12'. The display unit 150 includes a small diameter, elongated, rotary display tube 152 having end caps 154 and 156 mounted thereon and adapted to rotatably engage within the hollow adjacent end portions of the handle corner portions 158 and 160, respectively. A bowden-type cable 162, extending through the hollow interior of the handle 26', including the corner portion 158, is operably connected to the end cap 154. The opposite end of the bowden cable may be connected to a wheel (not shown) of the cart 12' in a manner similar to the power transmission systems previously described. Internal guides 164 may be located within the handle 26', including in the corner section 158, to maintain the cable 162 centered within the handle. The handle corner sections 158 and 160 are spanned by a handle central section 166 which is arcuate in cross section, thereby to provide rigidity to the handle. Ideally, clearance exists between the inside surface of handle section 166 and the outer surface of the rotary display tube 152.

Visual matter, for instance printed advertisements 168 may be wrapped around the display tube 152 by any convenient method, for instance by use of an adhesive backing or tape, not shown. A transparent cover 170 is used to cover the portion of the rotary display tube 152 not encased by the handle section 166, which portion preferably corresponds to that which is visible by a shopper pushing the cart 12'. Ideally, the transparent cover is designed to magnify the printed advertisements 168 thereby to be easily read by the shopper. Also, the cover is formed with longitudinal lip edges 172 which are designed to "snap fit" within the corresponding longitudinal edges of the handle central section 166. This enables the cover to be securely locked in place, but also readily removed when desiring to replace the printed advertisements 168. It will be appreciated that rather than utilizing printed advertisements 168, other visual materials may be mounted on the rotary tube 152, for instance a store directory, news articles, or other items of interest.

It will be appreciated that the rotary display unit 150 provides the same advantages as the other rotary display units discussed above, while not altering the basic configuration of a standard shopping cart. In this regard, the rotary display unit 150 is capable of presenting advertisements or other printed matter to the shopper in a moving, active manner thereby to not only catch the interest of a shopper, but also present a significant amount of information to the shopper.

A further preferred embodiment of the present invention is illustrated in FIGS. 12 through 16 wherein a powered display unit 180 is mounted on the front of a shopping cart 12". The display unit 180 is somewhat similar to the display unit shown in FIGS. 8 and 9 in that the display unit 180 utilizes an endless powered belt 181 to present a relatively flat visual media surface to the shopping cart user.

Figure 12:
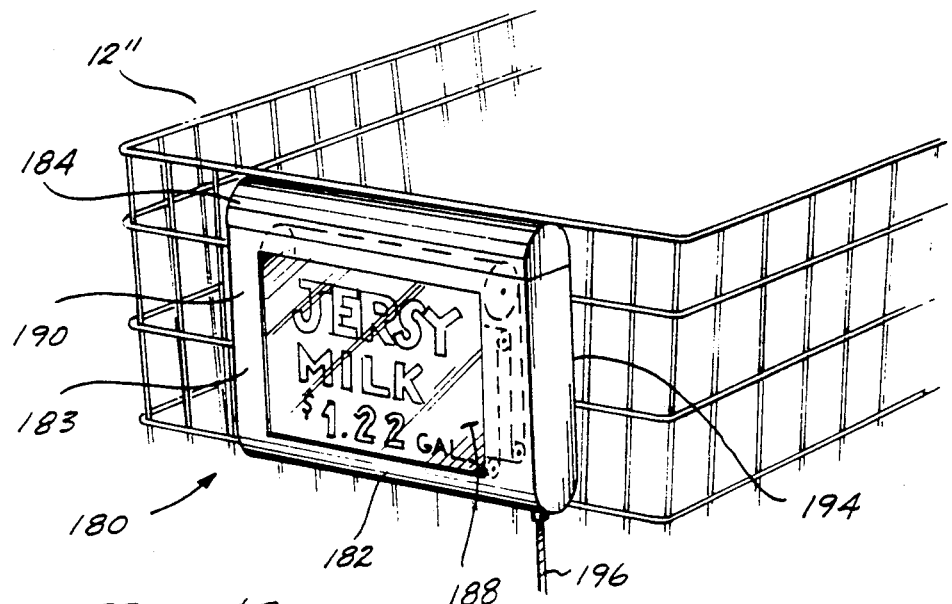
FIG. 12 is a pictorial view illustrating another preferred embodiment of the present invention wherein the power display unit utilizes a flexible belt trained about a drive roller and a plurality of idler rollers and disposed in a cassette that is removable from a housing mounted on a shopping cart.
Figures 13, 14:
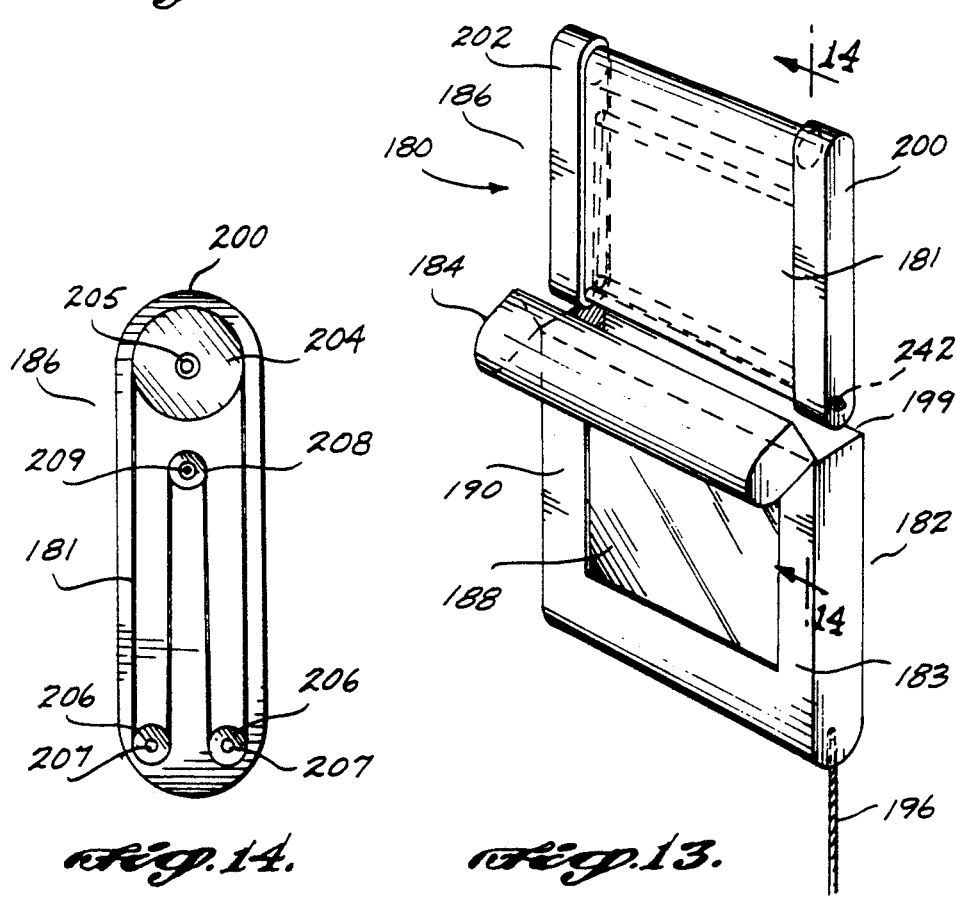
FIG. 13 is a pictorial view illustrating the cassette display of FIG. 12 removed from the housing.
FIG. 14 is a cross-sectional view of the display cassette of FIG. 13, taken substantially along lines 14—14 thereof.

Referring initially to FIGS. 12 and 13, the display unit 180 includes an outer housing 182 securely mounted to the shopping cart by any convenient means. The housing includes a body section 183 and an openable top 184 which may be hinged or otherwise attached to the housing body. The housing body 183 is sized to slidably receive a close fitting display cassette assembly 186 described more fully below. A transparent forward display window 188 is mounted over an opening formed in the housing front panel 190. A similar rear window (not shown) may be disposed within an opening formed in the housing rear panel 194. The front and rear display windows enable the visual matter carried by the endless belt 181 to be conveniently viewed by both the shopper pushing the cart 12" as well as shoppers located in front of the cart.

A bowden cable 196, similar to cable 132 shown in FIG. 8, is utilized to power the display unit 180. In this regard, the end of the bowden cable, as shown in FIG. 14, is operably connected to the lower end of an upwardly projecting male drive shaft rotatably mounted to the bottom of the housing 182 by any convenient means, to rotate with the rotation of the bowden cable. The opposite end of the bowden cable 196 is operably connected to a wheel (not shown) of the shopping cart 12" in a manner similar to the power transmission systems described previously.

Referring specifically to FIGS. 13 and 14, the display cassette assembly 186 includes end columns 200 and 202 supporting an upper drive roller 204 rotationally mounted on an axle 205 as well as a pair of lower idler rollers 206 rotationally mounted on axles 207 and an upper idler roller 208 rotationally mounted on an axle 209. The ends of the axles 205, 207 and 209 are supported by the end columns 200 and 202.

Preferably, the idler rollers 206 and 208 are of a size somewhat smaller than the drive roller 204 to facilitate constructing the display cassette assembly 186 in a compact manner. As will be appreciated, by utilizing the three idler rollers 206 and 208, the length of the display belt 181 is substantially longer than would be possible to place within the housing 182 if a singular idler roller were utilized in the manner of the power display unit illustrated in FIGS. 8 and 9. The construction of the display belt 181 may be similar to that of the display belt 124 described above. In addition, the construction of the drive roller 204 and idler rollers 206 and 208 may be similar to the construction of the drive roller 126 and idler roller 128, described above.

A unique intermittent drive and indexing system 210, disposed within the support column 202, is utilized in conjunction with the powered display unit 180. Referring specifically to FIGS. 15 and 16, the intermittent drive system 210 includes a hollow drift shaft 212 fixedly attached to and extending outwardly from the adjacent end of the drive roller 204. The drive shaft 212 is rotatably engaged over the axle 205. A small diameter drive sprocket 216 is securely mounted on the free end of the drive shaft 212. A larger diameter speed reducer sprocket 218 is drivingly interconnected with the drive sprocket 216 through a drive chain 220. It is to be understood that the drive chain 220 may be replaced by other types of power transmission devices, such as a cog belt and the drive and speed reducer sprockets 216 and 218 may be replaced by pulleys or other components appropriate for the type of belt utilized.

The speed reducer sprocket 218 is mounted on a hollow jack shaft 222 engaged over an axle 224 spanning across the width of the column 200, with the ends of the axle 224 being supported by the walls of the column. A speed reducer gear 230 is securely mounted on one end of the jack shaft 222. The speed reducer gear 230 intermittently meshes with a plurality of gear teeth of teeth sets 232 located about the outer perimeter of a bevel gear 234. The outer perimeter of the bevel gear 234 is smooth between the teeth sets 232 and also is of a diameter smaller than the root diameter of the gear teeth of the sets 232. The bevel gear 234 is rotationally mounted on an axel 236 having its end portions supported by the walls of the column 200. The bevel gear 234 also has "standard" bevel gear teeth 240 that mesh with beveled drive gear 242 rotationally mounted at the bottom of the column 200. A socket cavity 243 is formed in the bottom of the bevel gear 242 to snugly receive the male drive shaft 198 drivingly connected to the adjacent end of the bowden cable 196. As a result, when the display cassette assembly 186 is slidably lowered into the close fitting housing 182, the male drive shaft 198 automatically engages within the socket cavity 243 formed within the underside of the bevel drive gear 242.

In operation, when the shopping cart 12" is pushed, the power transmission system, composed in part of the bowden cable 196 and male drive shaft 198 continually rotates the female bevel gear 242 which in turn continually rotates the bevel driven gear 234 at a reduced speed. The teeth sets 232 disposed about the perimeter of the bevel gear 234 intermittently drive the speed reducer gear 230 which in turn intermittently powers the drive roller 204 through the chain 220 and the sprockets 216 and 218. The various bevel gears and sprockets are sized and the number of teeth in each teeth set 232 and the spacing between the teeth sets are selected so that the display belt 181 advances a desired distance each time a gear teeth set 232 meshes with the speed reducer gear 230. Ideally, this distance coincides with the distance between adjacent advertisements or other printed matter carried by the belt 181. As a result, the belt 181 is rapidly and intermittently advanced just far enough so that the next advertisement or printed matter on the belt comes quickly into registry with the front and rear display windows of the housing 182 when the shopping cart travels a preselected distance. The combination of a sustained, steady display of each advertisement or printed matter and then the rapid but smooth transition between advertisements or printed matters creates a visually pleasing effect that will attract the attention of shoppers.

Once a gear teeth set 232 is out of mesh with the teeth of the speed reducer gear 230, the belt 181 is held stationary relative to the housing windows by a formed leaf spring 244 mounted on the interior of the column 200 by a hardware member 246 engaged with the upper end of the leaf spring. The lower end of the leaf spring 244 is constrained from lateral movement but is free to move in the longitudinal distance relative to the length of the leaf spring. In this regard, a slot, not shown, may be formed in the lower end of the leaf spring for reception of a pin, not shown. The intermediate portion of the leaf spring 244 is bowed outwardly to engage within arcuate notches 250 formed in the outer perimeter of an alignment cam 252 fixedly mounted to the jack shaft 222 on the side of the speed reducer sprocket 218 opposite the speed reducer gear 230.

It will be appreciated that the engagement of the central portion of the leaf spring 244 with a notch 250 prevents the alignment cam 252 from rotating which in turn prevents the drive roller 204 from rotating which in turn maintains the display belt 181 in a stationary position. However, when the next set of gear teeth 232 meshes with the speed reducer gear 230, the alignment cam 252 rotates relative to the leaf spring 244 so that by the time the gear teeth set has passed out of mesh with the speed reducer gear 230, the next notch 250 of the alignment cam is in alignment with the central portion of the leaf spring 244. In this manner, a particular visual display disposed on the display belt 181 is held stationary and in registry with the display windows until the next set of gear teeth 232 meshes with the speed reducer gear 230.

Figure 17:
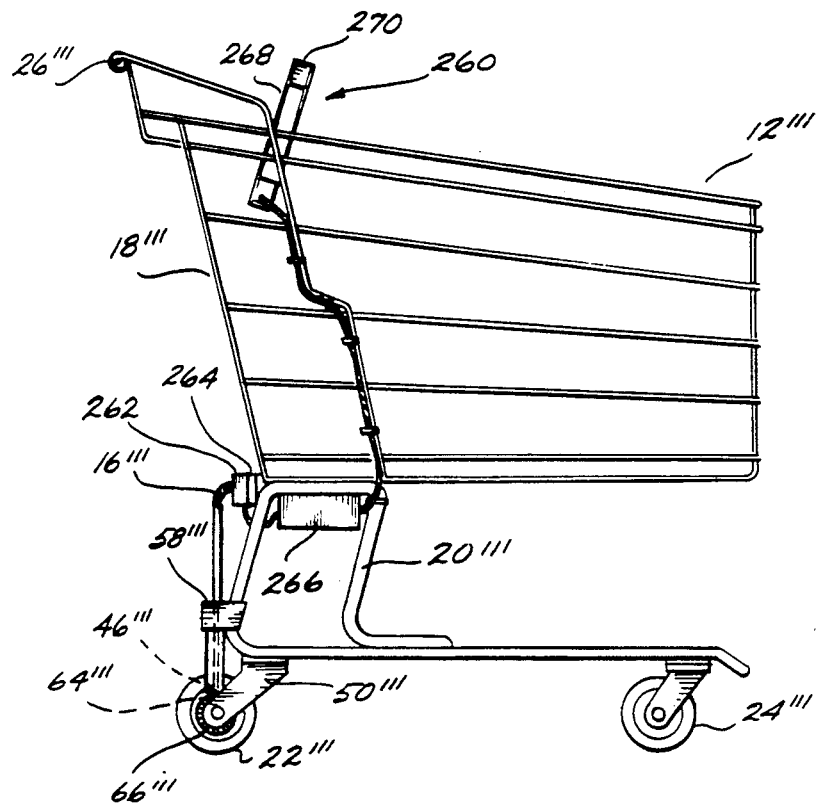
FIG. 17 is a side elevational view of a further preferred embodiment of the present invention utilizing an electronic display unit powered by movement of the shopping cart.
Figure 18:
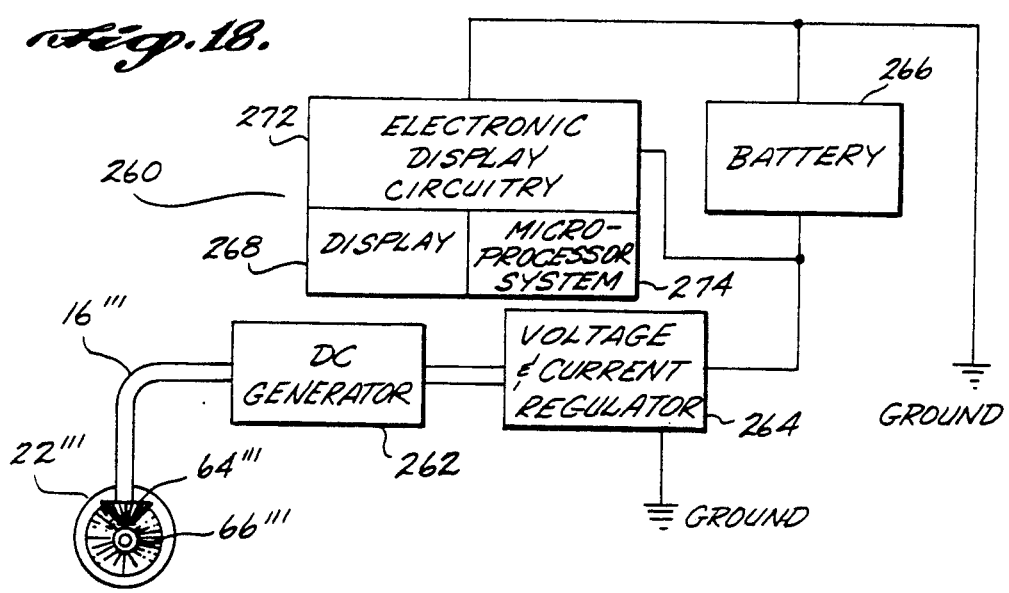
FIG. 18 is a schematic view of the display system utilized in FIG. 17.

A further preferred embodiment of the present invention is illustrated in FIGS. 17 and 18 wherein a powered display unit 260 is illustrated as in the nature of an electronic display unit powered by a power supply system 258 by electricity generated during manual propellment of a shopping cart 12'''. The components of the present invention illustrated in FIGS. 17 and 18 which correspond to the same components of the embodiment of the present invention shown in FIGS. 1–3 are identified with the same part numbers, but with a triple prime (''') designation. Thus, the description of these components will not be repeated at this time.

As illustrated in FIGS. 17 and 18, the power supply system 258 converts the rotational power from a wheel 22''' of the shopping cart 12''' into electrical energy through a DC generator 262, located at the lower rear of the basket 18''' of the shopping cart 12'''. The power from the wheel 22''' is transmitted to the generator 262 through a bowden cable 16'''. A small bevel follower gear 64''', secured to the inner core 46''' of the lower end portion of the bowden cable 16''', meshes with a perpendicularly disposed, larger, and correspondingly beveled drive gear 66''' mounted on the shopping cart wheel 22''' about the rotational axis of the wheel. The rotation of the bowden cable 16''' is utilized to power the DC generator 262 thereby to generate electricity. The electricity from the DC generator 262 is routed to the electronic display unit 260 to power the display unit.

In that the current and voltage levels of the electrical power generated by the DC generator will vary depending upon the speed that cart 12''' is propelled, preferably a voltage and current regulator 264 is interposed between the DC generator and the electronic display unit 260. To provide electrical power to the electronic display unit 260 when the cart 12''' is in stationary condition, ideally a rechargeable battery 266 is interposed between the voltage/current regulator 264 and the electronic display unit 260. In FIG. 17, the battery is located beneath the rear of the cart basket 18'''. The voltage/current regulator also prevents discharge of the battery through the generator when the generator is not producing electrical power.

The electronic display unit may include a liquid crystal display (LCD) and/or light-emitting diode (LED) display 268, both of which are standard articles of commerce. These types of displays are advantageous in that they require very low levels of electrical power. The LCD/LED display 268 is disposed within a housing 270 preferably mounted at the rear portion of the cart 12''' at an angle so that the display 268 is clearly viewable by the shopper pushing the cart. However, it is to be understood that the display unit 260 may be placed in other locations about the cart.

Ideally, the display unit 260 includes appropriate circuitry 272 as well as a microprocessor 274 and electronic memory devices, for instance ROMs, to provide the desired text, graphics, or other visual matter to be shown on the display 268. The microprocessor 274 may be programmed by periodically interconnecting the electronic display circuitry 272 with a central processor, not shown. As an alternative, instructions from the central processor can be transmitted to the electronic display circuitry through airborne signals from a transmitting unit to a receiver, not shown, incorporated into the electronic display circuitry. This has the advantage of not requiring that the carts 12''' be taken out of service while being reprogrammed. As a further alternative, one or more memory devices, not shown, composing part of the electronic display circuitry could be periodically conveniently replaced, with the new memory device containing the new material to be outputted on the display 268.

It will be appreciated, that through the present invention, it should not be necessary to periodically recharge the battery 266 in that sufficient electrical energy should be produced by the generator 262 during rolling movement of the cart 12'''. As a consequence, the frequency and amount of servicing of the display system 260 is reduced. It will also be appreciated that through the present invention, an electronic display unit, such as unit 260, may be utilized in conjunction with other types of display units illustrated above in FIGS. 1 through 16, with all of the display units being powered by a power supply system utilizing the rotating wheels of the shopping cart.

It is to be understood that in addition to providing a visual output, the display system 260 can utilize an audio output to enhance the visual output and also to assist those shoppers that have impaired sight. The power supply for the audio output could be the same as discussed above for the video display.

It is also to be understood that rather than mounting the electrical generator 262 at the lower, rear portion of the shopping cart basket 18''', the generator may be placed at other convenient locations, for instance, adjacent the wheel 22'''. If located adjacent the wheel 22''', it may not be necessary to utilize the bowden cable 16''' rather, the follower gear 64''' may be connected directly to the DC generator. As a further alternative, the cart wheel 22''' may be fitted with a jack shaft along the rotational axis of the wheel for direct connection to the DC generator. Also, the voltage regulator 264 may be incorporated with carrier of the electronic display circuitry, such voltage regulators are standard articles of commerce. Further, the battery 266 may be located within the display housing 270, since in physical dimension the battery need not be very large while still having sufficient capacity to power the display 268 when the shopping cart 12''' is not in motion. Thus, there need not be any mechanical or electrical components actually mounted on the frame of the cart, rather all of the components may be located either adjacent the wheel 22''' or within the display housing 270. As such, the only interconnection that may exist between the wheel 22''' and the display unit 260 may be electrical wires. This arrangement would facilitate the installation of the display unit 260 on the shopping cart 12'''.

Figure 20:
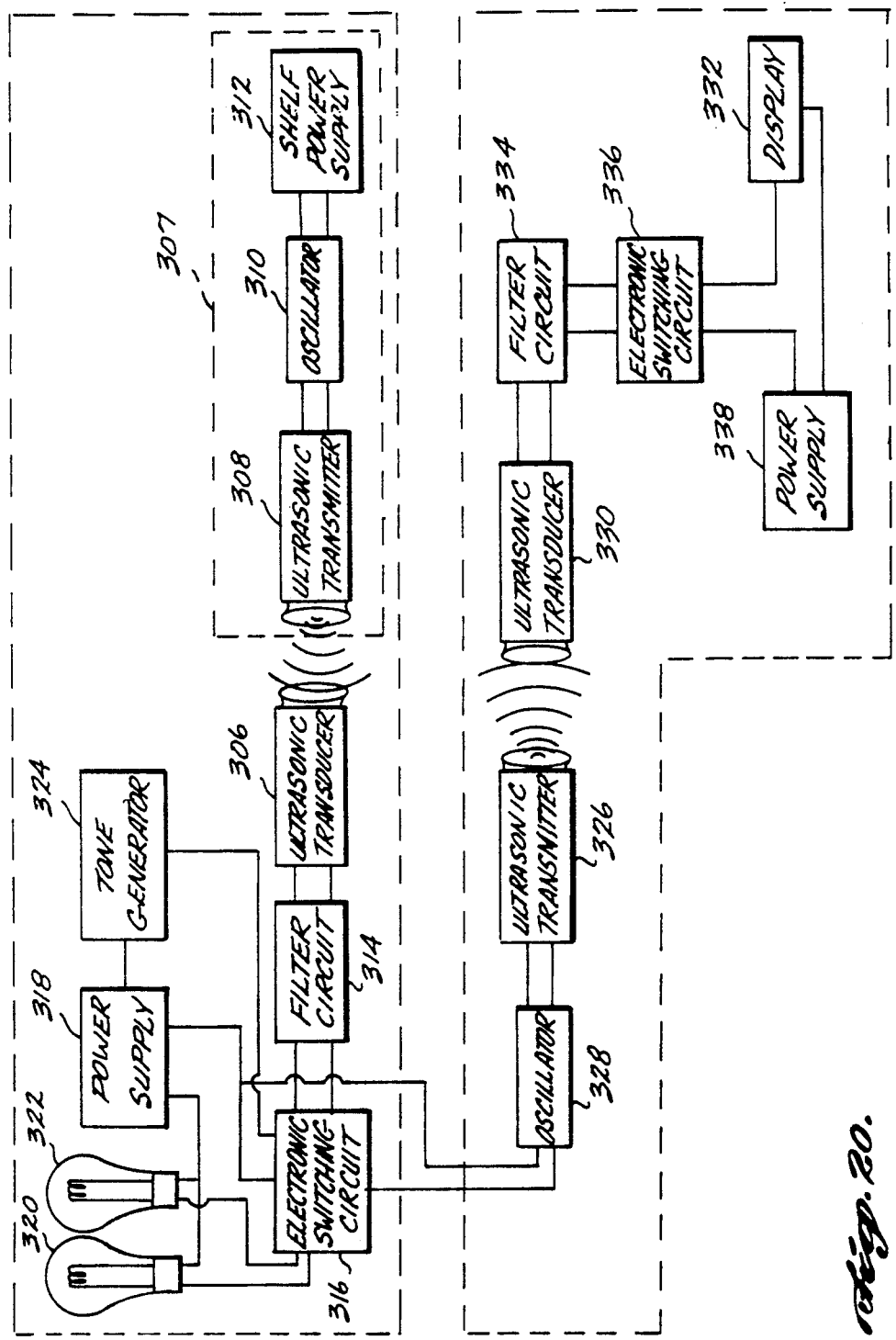
FIG. 20 is a schematic view of the display system illustrated in FIG. 19.

A further preferred embodiment of the present invention is illustrated in FIGS. 19 and 20 wherein a display system 299 includes powered display unit 300 mounted on the front of a shopping cart 12d. The display unit 300 may be similar to the display unit 180 shown in FIGS. 12-16 in that a powered endless belt (not shown) is utilized to present a relatively flat visual media surface to the shopping cart user. However, it is to be understood that the display unit 300 may be of other configurations without departing from the spirit or scope of the present invention, for instance, in a form similar to the display unit 122 shown in FIGS. 8 and 9 or the display unit 260 shown in FIGS. 17 and 18.

The components of the present invention illustrated in FIGS. 19 and 20 which correspond to the components of the embodiments of the present invention described above are indicated with the same part number, but with the suffix "d." Thus, the descriptions of these components will not be repeated at this time.

The power display unit 300 includes an outer housing 302 defining a rearward viewing window 304 to enable the user of a cart to view advertisements and other visual matter while pushing the cart 12d. A front window, not shown, may be provided at the front side of the housing 302.

The display system 299 also includes an audio transducer or microphone 306 mounted within the lower side portion of housing 302 for receiving inaudible, low intensity sound waves generated by a signal generator 307 composed of an ultrasonic transmitter 308 strategically placed on store shelves or other desired locations at an elevation corresponding to the elevation of the audio transducer 306. The ultrasonic transmitter 308 may be in the form of a speaker which is driven by an oscillator 310 which in turn is powered by a power supply 312. The power supply 312 may utilize a battery or current from a standard electrical outlet. The ultrasonic sound waves generated by the speaker 308 are received by the ultrasonic receiver 306, i.e., transducer, and converted into an electrical signal that is transmitted through an appropriate filter circuit 314 and then to a switching circuit 316 both located within the housing 302, thereby to activate one of the display lights 320 and 322 located at the upper portion of the housing to alert the shopper to an item of potential interest. Preferably a receiver 306 is located on both sides of the housing 302 to receive sound waves from both sides of the cart 12d.

If the ultrasonic transmitter 308 is on the shopper's left, the left display light 322 is activated, while if the transmitter is on the shopper's right-hand side, the right-hand display light 320 is activated. As illustrated in FIG. 19, the display lights 320 and 322 may be in the form of directional arrows. In addition to activating one of the display lights 320 and 322, an audio tone generator 324 may be activated by the switching circuit 316 to provide the shopper with a audible cue that an item of interest is at hand. As with the other components of the display system 299 shown in FIG. 20, the tone generator 324 preferably is located within the interior of the display housing 302.

Power for the display lights 320 and 322 as well as for the tone generator 324 is provided by power supply 318 interconnected between the switching circuit 316 and the display lights and the tone generator. The power supply may be in the form of a battery pack, not shown, or may be generated by manual propellment of the shopping cart 12d in the manner of the supply system 258, described above, utilized in conjunction with the embodiment of the present invention shown in FIGS. 17 and 18.

As an alternative to the display lights 320 and 322, different types of visual cues or display units may be utilized. For instance, the display unit 300 can be electronic in nature, and thus, the switching circuit 316 may be utilized to activate such electronic display to produce directional arrows within the display window 304 and/or other type of visual output, i.e., a video advertisement.

As an alternative, or in addition to a visual display produced by the display unit 300, the display system 299 of the present invention may be configured to activate a stationary display 332, for instance, located on a store shelf or wall. Referring specifically to FIGS. 19 and 20, the electronic switching circuit 316 utilized to activate the display lights 320 and 322 may also be employed to activate one or more ultrasonic transmitters 326, e.g. speakers, mounted on the cart 12d, for instance, on each side of the display unit housing 302 at an elevation above the transducer 306. The ultrasonic transmitter 326 are driven by oscillators 328 which in turn are powered by the power supply 318.

The ultrasonic signal produced by the transmitter 326 is received by an audio transducer or receiver 330, e.g. a microphone, associated with the shelf display unit 332. The display unit 332 may be in numerous different forms from as simple as a system of flashing lights to as sophisticated as a video or animated audiovisual display. The signal from the transducer 330 is transmitted through a filter circuit 334 to an electronic switching circuit 336 to interconnect the display 332 with a power supply 338. In accordance with the present invention, the transducer 330 senses the presence of a shopping cart 12d due to the ultrasonic signal generated by the transmitter 326. The display lights 320 and 322 direct the shopper's attention to the shelf display 332 which produces a visual and/or audio output display in the presence of the shopper. In the absence of the shopping cart 12d, the shelf display unit 332 remains dormant.

It will be appreciated that the signal generator 307 and shelf display unit 332 may be placed at any desired location about the store. The signal generator 307, and perhaps also the display 332, may be battery powered, thereby allowing them to be moved to any location without restriction.

It will also be appreciated that the display system 299 does not attempt to transmit information via airborne signals so that there is no need to decode information from an airborne signal. Instead, the ultrasonic signals utilized in the display system 299 simply activate a switch which then initiates other functions, such as turning on the display lights 320 and 322, activating the tone generator 324 to produce an audible tone or activating a shelf-mounted display, such as display unit 332. Moreover, the focused, low-intensity ultrasonic waves utilized in conjunction with the display system 299 attenuate relatively quickly with distance. As such, interference problems are not encountered. Signal interference is a significant problem in electromagnetic signal-based information transmission systems. In such electromagnetic wave systems, interference may originate from many sources, including the switching on and off of lights as well as the operation of other electronic components and machinery.

A further preferred embodiment of the present invention is illustrated in FIGS. 21 and 22 wherein the components of the display system 350 which correspond to components of previous embodiments of the present invention described above are indicated with the same part number, but with the suffix "e." Thus, the descriptions of these components will not be repeated at this time.

As shown in FIGS. 21 and 22, the display system 350 includes a scroll type display unit 352 having a long carrier sheet 354 wound on spools 354 and 356 supported by axles 358 and 360, respectively, which in turn are journaled within a housing 362 mounted at the front of the shopping cart 12e. A plurality of advertisements 364a, 364b, etc. are spaced apart along the carrier sheet 354 and presented to the user of the shopping cart through a rear window 366 formed in the housing 362. A similar window, not shown, may be formed in the front of the housing. The spools 355 and 356 are powered by an electric motor 368 disposed within the housing 362 and operably connected to the lower end of axle 358. An endless belt 370 is trained about pulleys 372 and 374 mounted on the axles 358 and 360, respectively, to rotate the spools 355 and 356 in unison under the power of the motor 368. The motor 368 is activated by an appropriate power supply system, for instance, the power supply system 258e shown in FIG. 18.

The motor 368 may be employed to continuously advance the carrier sheet 354 so that the individual advertisements or printed displays 364 may be sequentially presented to the user of the shopping cart through the rear window 366. When the end of the carrier sheet is reached so that the carrier sheet is entirely wound on one of the spools 355 or 356, then the motor may be reversed to wind the carrier sheet on the empty spool, utilizing well known and commercially available technology.

As an alternative to or in addition to simply continually advancing the carrier sheet 354, the present invention contemplates presenting particular advertisements or other individual displays to the user of a shopping cart in particular desired sequences not necessarily corresponding to the sequence in which the individual displays 364 are located along the carrier sheet 354. To this end, the marginal portion of the carrier sheet 354, e.g., beneath each display 364, is encoded with an optical, electromagnetic or other type of code. The particular coding technique illustrated in FIG. 1 comprises a pattern of punched holes 378, with the pattern for a specific display 364 being unique to that display. A sensor 380 in the form of an optical scanner is mounted within the housing 362 and positioned to be in registry with the hole patterns 378 as they pass by thereby to track the position of the carrier sheet 354, including the particular visual display being presented through the window 366. It is to be understood that other types of encoding systems may be utilized in place of the patterns of punched holes 378, for instance, a bar code or a magnetic strip may be employed. Both of these alternative encoding devices are well known and widely commercially available.

Referring additionally to FIG. 22, frequency sensitive ultrasonic transducers or receivers 382 are mounted within the housing 362 at appropriate locations, for instance, similar to the locations of the transducer 306 shown in FIG. 19. The transducers 382 are capable of detecting different ultrasonic signals from different ultrasonic transmitters 384 located about the store. The ultrasonic transmitters 384 emit low-intensity sound waves which cannot be heard by the human ear but which is detectable by transducers 382. The ultrasonic transmitters 384 are driven by oscillators 386 which in turn are powered by power supplies 388 in the manner of the present invention illustrated in FIGS. 19 and 20, discussed above.

The ultrasonic transducer 382 may be in the form of a microphone capable of operating within the frequency ranges of the ultrasonic transmitters 384. The signal from the ultrasonic transducer is transmitted through a filter circuit 390 and then to a control circuit 392 interposed between the motor 368 and the power supply 258e thereby to control the operation of the motor. When a particular ultrasonic frequency is detected by the transducer 382 and transmitted to the control circuit 392, the control circuit directs the electric motor 368 to move the carrier sheet 354 to a particular visual display(s) 364 associated with the triggering transmitter 384 so that a desired advertisement or other visual display may be presented to the shopper, for instance, coinciding to the particular product adjacent the ultrasonic transmitter and thus also located adjacent the shopping cart as the shopping cart passes by the ultrasonic transmitter. Due to the low intensity of the ultrasonic waves emitted by the transmitter 384, the present invention would not be susceptible to interference problems associated with other types of display systems utilizing airborne signals.

When an ultrasonic signal is not being received by the transducer 382, the control circuit preferably is controlling the motor 368 to advance the carrier sheet 354 at a desired frequency or rate as metered by a timer 394. It will be appreciated that in this manner a particular visual display 364 may be presented to the shopper for a desired length of time and then the motor 368 activated to rapidly advance the carrier sheet to place the next visual display 364 in registry with the display window 366 thereby providing an "intermittent" motion similar to that achieved by the mechanical system illustrated in FIGS. 13–16.

As an alternative or in addition to the foregoing automatic triggering system, the particular visual displays 364 being presented to the shopper may be controlled by the shopper by a set of control buttons, for instance, buttons 396a–396d mounted on a control panel 398 located adjacent the handle 26e of the shopping cart 12e. The control buttons 396 are integrated with the control circuit 392 to allow the shopper to control the operation of the display unit 352. For instance, the control buttons 396a and 396b may be programmed to cause the carrier sheet 354 to move in the forward and backward directions, respectively, so that the shopper can quickly scan the particular individual visual displays 364 located along the carrier sheet 354. Also, the buttons 396 may be programmed to bring specific categories of advertisements into view, for instance advertisements for produce, meats, dairy products, etc. Further, the particular buttons 396 may be programmed for displaying current sale items, store maps or other information on product locations. It will be appreciated that use of the buttons 396 will allow the shopper to view sale items or advertisements for particular types of products without actually having to walk to the particular section of the store in which the items are located.

Although the present invention illustrated in FIGS. 21 and 22 has been described in conjunction with an electrically powered display unit 352, it is to be understood that the carrier sheet 354 may be powered by the rolling movement of the shopping cart 12e in the manner similar to the embodiments of the present invention illustrated in FIGS. 1-4, 8-10 and 12-16. Moreover, when the carrier sheet 354 is wound in one direction, an internal spring (not shown) located within one of the spools 55 or 56 may be wound, and then when the end of the carrier sheet is reached, the spring may be released to cause the carrier sheet to rapidly rewind so that the display process may begin again. Such windup mechanisms are well known in the art.

The present invention has been described in relation to several preferred embodiments. One of ordinary skill after reading the foregoing specification may be able to affect various other changes, alterations, and substitutes or equivalents without departing from the broad concepts disclosed. It is therefore intended that the scope of Letters Patent granted hereon be limited only by the definitions contained in the appended claims and the equivalents thereof.

The embodiments of the invention in which an exculsive property or privilege is claimed are defined as follows:

1. A display system, comprising:
   (a) a shopping cart;
   (b) a first signal generator located remote from the shopping cart;
   (c) a first signal receiver mounted on the shopping cart for receiving signals from the first signal generator;
   (d) a visual output signal mounted on the shopping cart;
   (e) a first control circuit to activate the visual output device upon reception of an appropriate signal from the first signal generator by the first signal receiver;
   (f) a second signal generator mounted on the shopping cart;
   (g) a display located remote from the shopping cart;
   (h) a second signal receiver associated with the remote display to receive signals from the second signal generator; and,
   (i) a second control circuit to activate the remote display upon reception of an appropriate signal by the second signal receiver from the second signal generator.

2. The display system according to claim 1, wherein the second signal receiver includes means for receiving the second signal when the shopping cart is within a certain proximity of the remote display.

3. A display system comprising:
   (a) a shopping cart;
   (b) a first audio signal generator located remote from the shopping cart;
   (c) a first audio signal receiver mounted on the the shopping cart for receiving signals from the first audio signal generator;
   (d) a visual output device mounted on the shopping cart;
   (e) a first control circuit to activate the visual output device upon reception of an appropriate signal from the first signal generator by the first signal receiver;
   (f) a second audio signal generator mounted on the shopping cart;
   (g) a display located remote from the shopping cart;
   (h) a second signal receiver associated with the remote display to receive signals from the second signal generator; and,
   (i) a second control circuit to activate the remote display upon reception of an appropriate signal by the second signal receiver from the second signal generator.

4. The display system according to claim 3, wherein the second signal receiver includes means for receiving the second signal when the shopping cart is within a certain proximity of the remote display.

* * * * *